US012675219B2

(12) United States Patent
Mannanal et al.

(10) Patent No.: US 12,675,219 B2
(45) Date of Patent: Jul. 7, 2026

(54) ENHANCED WORKLOAD MANAGEMENT USING INTERNAL COPY AND/OR ZONE-APPEND TECHNOLOGIES

(71) Applicant: Dropbox, Inc., San Francisco, CA (US)

(72) Inventors: Vishal Jose Mannanal, Renton, WA (US); Eric Shobe, Kihei, HI (US); Sandeep Kumar R. Ummadi, Issaquah, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/819,487

(22) Filed: Aug. 29, 2024

(65) Prior Publication Data

US 2026/0064274 A1      Mar. 5, 2026

(51) Int. Cl.
*G06F 3/06*          (2006.01)

(52) U.S. Cl.
CPC ............ *G06F 3/061* (2013.01); *G06F 3/0655* (2013.01); *G06F 3/0676* (2013.01)

(58) Field of Classification Search
CPC .... G06F 3/0604; G06F 3/0652; G06F 3/0673; G06F 3/0679
See application file for complete search history.

(56) References Cited

U.S. PATENT DOCUMENTS

| | | | |
|---|---|---|---|
| 10,037,779 B1 * | 7/2018 | Mendonsa | .............. G11B 21/08 |
| 10,170,151 B2 | 1/2019 | Aiello et al. | |
| 11,550,727 B2 | 1/2023 | Bhardwaj | |

| | | | |
|---|---|---|---|
| 2013/0104137 A1 * | 4/2013 | Fukuzaki | .............. G06F 9/4887 |
| | | | 718/102 |
| 2017/0242790 A1 * | 8/2017 | O'Krafka | .............. G06F 3/0652 |
| 2018/0351816 A1 * | 12/2018 | Li | ........................ G06F 11/3452 |
| 2020/0294548 A1 * | 9/2020 | Luo | ......................... G06F 3/061 |
| 2021/0064269 A1 * | 3/2021 | Ummadi | .............. G06F 3/0604 |
| 2021/0089208 A1 | 3/2021 | Jin et al. | |
| 2022/0156000 A1 | 5/2022 | Inbar et al. | |

(Continued)

OTHER PUBLICATIONS

Tehrany N., et al., "ZNS-Tools: An eBPF-powered, Cross-Layer Storage Profiling Tool for NVMe ZNS SSDs," Proceedings of the 4th Workshop on Challenges and Opportunities of Efficient and Performant Storage Systems (CHEOPS '24), Apr. 22, 2024, pp. 23-32, Retrieved from the Internet: URL: https://doi.org/10.1145/3642963.3652205.

*Primary Examiner* — Jane W Benner
(74) *Attorney, Agent, or Firm* — Keller Preece PLLC

(57)          ABSTRACT

The present technology enhances workload management of data storage systems by using an internal copy function and/or a zone-append technology. The internal copy function is used, e.g., in merge operations to move data between locations on a disk without using off-disk resources (e.g., processing or memory of a CPU). Zone-append technology uses nameless writes (e.g., write instruction without an assigned destination address on the disk) to combine IO units from different threads to be written to a common zone of a disk (e.g., a shingled magnetic recording (SMR) disk). Sequential addresses are assigned to IO units from different threads based on their order in the write queue, reducing the latency and seek time typically associated with random writes. The zone-append technology, e.g., uses sequential write operations within specified zones, allowing the disk to determine the actual write location and to report post-write logical block addresses (LBAs).

20 Claims, 11 Drawing Sheets

— 800

Receive Write Instructions at a Disk. The Write Instructions Include Respective Threads, Including a First Thread and a Second Thread, and Each Thread Includes Instructions to Write Input-Output (IO) Units to the Disk 802

Append IO Units of the Threads to a Write Queue. The Write Queue Combines the Different Threads and Writes the IO Units From the Threads to a Common Zone (E.G., the IO Units of the First and Second Threads Are Appended to the Queue to Write to the Common Zone) 804

Assign Respective Write Addresses to Each of the IO Units in the Queue. The Write Addresses Are in the Common Zone 806

Provide a Post-Write Local Block Address (LBA) Representing the Write Addresses Assigned to the IO Units 808

(56)        References Cited

U.S. PATENT DOCUMENTS

| | | | |
|---|---|---|---|
| 2022/0188020 A1* | 6/2022 | Ishiguro | G06F 3/0604 |
| 2023/0266898 A1 | 8/2023 | Bert | |
| 2023/0376239 A1 | 11/2023 | Yoshida et al. | |
| 2024/0020228 A1 | 1/2024 | Bahirat et al. | |
| 2024/0220143 A1 | 7/2024 | Yang et al. | |

* cited by examiner

CONTENT
ITEM
STORAGE
<u>110</u>

Figure 7A:
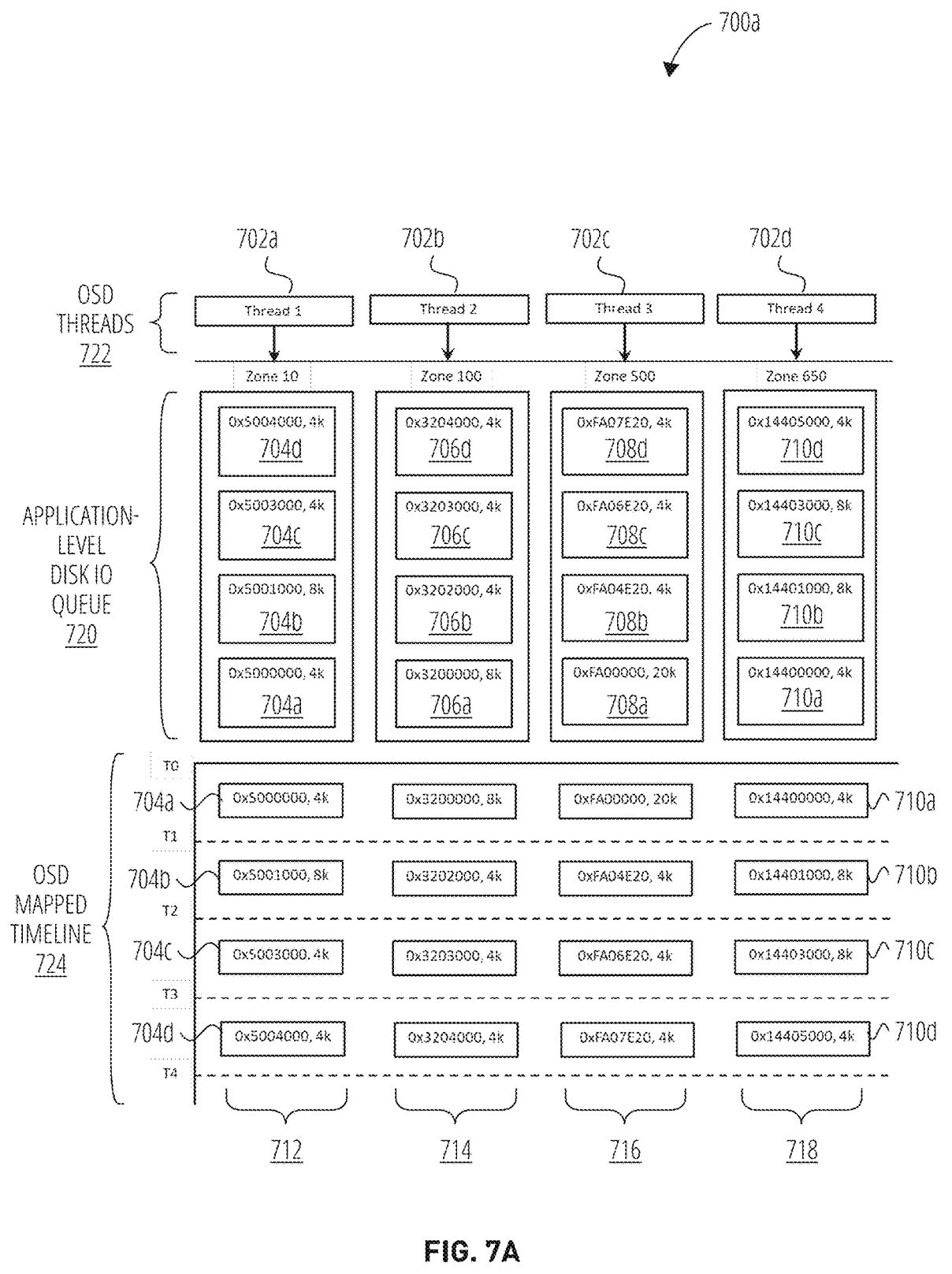

700a

| | 702a | 702b | 702c | 702d |
|---|---|---|---|---|
| OSD THREADS 722 | Thread 1 | Thread 2 | Thread 3 | Thread 4 |

| | Zone 10 | Zone 100 | Zone 500 | Zone 650 |
|---|---|---|---|---|

APPLICATION-LEVEL DISK IO QUEUE 720

| | | | |
|---|---|---|---|
| 0x5004000, 4k 704d | 0x3204000, 4k 706d | 0xFA07E20, 4k 708d | 0x14405000, 4k 710d |
| 0x5003000, 4k 704c | 0x3203000, 4k 706c | 0xFA06E20, 4k 708c | 0x14403000, 8k 710c |
| 0x5001000, 8k 704b | 0x3202000, 4k 706b | 0xFA04E20, 4k 708b | 0x14401000, 8k 710b |
| 0x5000000, 4k 704a | 0x3200000, 8k 706a | 0xFA00000, 20k 708a | 0x14400000, 4k 710a |

OSD MAPPED TIMELINE 724

| | | | | |
|---|---|---|---|---|
| T0 | | | | |
| 704a | 0x5000000, 4k | 0x3200000, 8k | 0xFA00000, 20k | 0x14400000, 4k ⟋ 710a |
| T1 | | | | |
| 704b | 0x5001000, 8k | 0x3202000, 4k | 0xFA04E20, 4k | 0x14401000, 8k ⟋ 710b |
| T2 | | | | |
| 704c | 0x5003000, 4k | 0x3203000, 4k | 0xFA06E20, 4k | 0x14403000, 8k ⟋ 710c |
| T3 | | | | |
| 704d | 0x5004000, 4k | 0x3204000, 4k | 0xFA07E20, 4k | 0x14405000, 4k ⟋ 710d |
| T4 | | | | |

800

Receive Write Instructions at a Disk. The Write Instructions Include Respective Threads, Including a First Thread and a Second Thread, and Each Thread Includes Instructions to Write Input-Output (IO) Units to the Disk 802

Append IO Units of the Threads to a Write Queue. The Write Queue Combines the Different Threads and Writes the IO Units From the Threads to a Common Zone (E.G., the IO Units of the First and Second Threads Are Appended to the Queue to Write to the Common Zone) 804

Assign Respective Write Addresses to Each of the IO Units in the Queue. The Write Addresses Are in the Common Zone 806

Provide a Post-Write Local Block Address (LBA) Representing the Write Addresses Assigned to the IO Units 808

FIG. 8

ENHANCED WORKLOAD MANAGEMENT USING INTERNAL COPY AND/OR ZONE-APPEND TECHNOLOGIES

BACKGROUND

Large-scale online services store ever-increasing amounts of data. As just one example, a large-scale centrally hosted network file system might store multiple exabytes of data on hard disks housed in data centers around the world.

Cloud storage is a model of computer data storage in which data is stored remotely in logical pools and is accessible to users over a network. The physical storage spans multiple servers and sometimes in multiple locations. The physical environment can be owned and managed by a cloud computing provider. The cloud storage provider is responsible for keeping the data available and accessible, and the physical environment secured, protected, and running.

Shingled magnetic recording (SMR) is a magnetic storage data recording technology used in hard disk drives (HDDs) to increase storage density and overall per-drive storage capacity. Conventional hard disk drives record data by writing non-overlapping concentric magnetic tracks. In contrast, SMR disks write new tracks that overlap part of the previously written magnetic track, leaving the previous track narrower and allowing higher track density. SMR disks can be divided into many append-only, sequential zones of overlapping tracks.

Object storage is a computer data storage approach that manages data as blobs or objects, in contrast to other storage architectures like file systems or block storage. file systems manage data as a file hierarchy, and block storage manages data as blocks within sectors and tracks. In object storage, objects can be associated with a variable amount of metadata and a globally unique identifier. Object storage can be implemented at multiple levels, including the device level (object-storage device), the system level, and the interface level. Object storage systems allow the retention of massive amounts of unstructured data in which data is written once and read once (or many times).

Object storage devices (OSDs) can enhance data management efficiency by treating data as objects rather than traditional blocks, thereby enabling more effective management of large volumes of data. However, managing simultaneous write operations (e.g., balancing live writes and background writes) poses challenges in OSD environments, especially with the sequential write nature of SMR disks.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 7A illustrates a diagram of an example disk write architecture that writes threads to different zones in accordance with some embodiments of the present technology.

FIG. 8 illustrates a flow diagram of an example method of implementing a zone append technology that combines threads to write to a common zone in accordance with some embodiments of the present technology.

DETAILED DESCRIPTION

Figure 1:
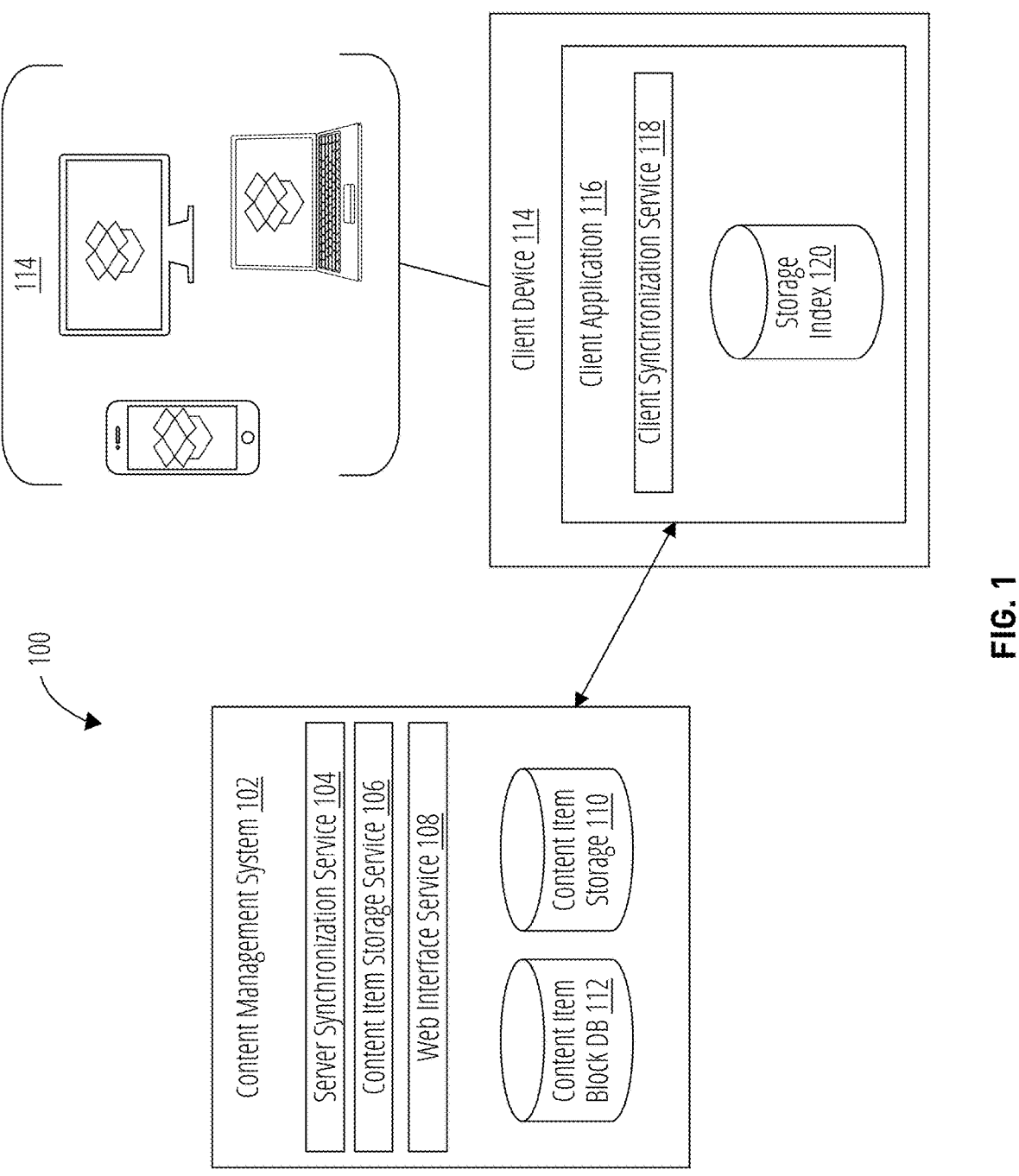
FIG. 1 illustrates an example of a content management system and client devices in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Content management systems can use a data storage system, such as MAGIC POCKET by DROPBOX. The data storage system can provide several operations that can be ongoing simultaneously, and each of these operations can represent different workloads that are issued using different threads.

One inefficiency in prior data storage systems results from the latency and seek time incurred by moving the head of a disk among the respective zones. In prior data storage systems, for respective threads writing to a disk, the threads were often addressed to write to different zones on the disk. When using a first-in-first-out (FIFO) protocol, the write queue is populated with a sequence of writes to different zones, resulting in decreased throughput due to a significant percentage of time (e.g., greater than 50%) moving between zones rather than writing to the disk. The systems and methods disclosed herein improve efficiency by making the write threads nameless (e.g., the threads do not include a particular address), and then assigning sequential write addresses to a single zone as the IO units from respective threads are added to the write queue. Thus, multiple threads can simultaneously be written to the disk without moving the head of the disk between zones.

According to certain non-limiting examples, assigning the write addresses to the IO units can occur before or concurrent with adding the IO units from respective threads to the write queue. In all cases, the write addresses to the disk can be assigned after the IO units of the respective threads have been received at the disk. Additionally or alternatively, the write addresses to the disk can be assigned after the IO units are in the application-level disk IO queue 720. The IO units in the application-level disk IO queue 720 can correspond to nameless write instructions (e.g., write instructions that do not include destination address on the disk). Thus, the write addresses are only assigned by the disk itself and depend on the order in which the IO write instructions are placed in the disk write queue.)

According to certain non-limiting examples, the systems and methods disclosed herein can implement data storage technologies to enhance data management and write efficiency in Serial Attached SCSI (SAS) disks, Serial Advanced Technology Attachment (SATA) disks, or SAS/SATA Shingled Magnetic Recording (SMR) disks. For example, the write efficiency in (SAS) or SATA SMR disks can be enhanced using the zone-append technology disclosed herein.

According to certain non-limiting examples, the systems and methods disclosed herein can be implemented in data storage technologies that use Object Storage Devices (OSDs). Generally, OSDs can enhance data management efficiency by treating data as objects rather than traditional blocks, allowing for more effective management of large volumes of data. However, managing simultaneous write operations (e.g., balancing live writes and background writes) can be challenging in OSD environments. These challenges can be compounded for SMR disks due to the sequential write nature of SMR disks. The systems and methods disclosed herein can incorporate Zone-Append technology into SAS/SATA SMR disks to improve write efficiency and overall system performance.

According to certain non-limiting examples, the systems and methods disclosed herein can be implemented in data storage technologies that use a Zone-Append technology in SAS/SATA SMR disks, enabling the disk to determine the actual write location within a specified zone and providing a post-write Logical Block Address (LBA). The systems and methods disclosed herein can abstract the specifics of physical location, thereby enhancing sequential write efficiency and providing for higher queue depths.

The systems and methods disclosed herein can be implemented by updating the firmware to provide additional support for writing multiple threads to a common zone by assigning sequential write addresses within the common zone to IO units from different threads as the IO units are added to the mapped timeline of the write queue. Further, the systems and methods disclosed herein can be implemented by modifying the SAS and/or SATA standards to support the new functionality in the write operations of multiple threads. Additionally, the systems and methods disclosed herein can be implemented by adapting the system and application software for improved LBA management. firmware to provide additional support for writing multiple threads to a common zone According to certain non-limiting examples, the systems and methods disclosed herein can implement the new zone-append technology by determining, at the disk, the actual write address within a specified zone, and the disk reports to the rest of the system the post-write LBA values, thereby enhancing sequential write efficiency and providing larger queue depths. According to certain non-limiting examples, the new zone-append technology provides larger queue depths within a zone, which improves both write efficiency and the effective handling of write requests.

According to certain non-limiting examples, the systems and methods disclosed herein can improve random write management by implementing random writes as sequential writes within zones to reduce latency and seek time. Implementing random writes as sequential writes within a zone, can be achieved by abstracting the physical locations specifics for threads of write instructions, and then determining a specific zone to be written to as the IO units are added to the write queue on the disk.

Additionally, the systems and methods disclosed herein can improve efficiency by reducing the number of read and write operations between the disk and the processor. For example, merge operations in which data is moved from a source location to a destination location on the same disk can be performed using an internal copy function on the disk itself, rather than using a processor to read the data from the disk and then write the data from the disk to the destination location on the disk. The internal copy allows the data to be moved without using resources external to the disk, thereby freeing up the CPU and other resources for other tasks.

According to certain non-limiting examples, the systems and methods disclosed herein can implement data storage technologies to improve data management efficiency and reduce system load by utilizing an internal copy function (e.g., SCSI Extended Copy command), rather than using reads and writes that use non-disk system resources (e.g., processing by the CPU). The systems and methods disclosed herein can be implemented using Shingled Magnetic Recording (SMR) disks.

Generally, data storage technologies manage large quantities of data and frequently perform a large volume of data operations that can strain system resources. For example, data movement methods can involve the host system's CPU, consuming considerable bandwidth and processing power. The systems and methods disclosed herein mitigate the bandwidth and processing power consumed when moving data by determining when disk internal copy commands (e.g., SCSI Extended Copy in SAS/SATA SMR drives) can be used instead of reads and writes to a host, and, when possible, using disk internal copy commands to move data within the disk. For example, using disk internal copy commands for merge operations, garbage collection, and/or compaction, which can account for about 30% of the operations in a data storage system, can free up processing resources to perform other tasks.

According to certain non-limiting examples, the systems and methods disclosed herein can use of disk internal copy commands to perform Logical Block Addressing (LBA) to LBA data transfers within the same disk. For example, the systems and methods disclosed herein can use a SCSI Extended Copy command to perform disk internal copies. of disk internal copy commands using SCSI Extended Copy. The systems and methods disclosed herein have the benefit of reducing the load on the host CPU, increasing system efficiency, enhancing reliability, and reducing energy consumption.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In some embodiments the disclosed technology is deployed in the context of a content management system having content item synchronization capabilities and collaboration features, among others. An example system configuration 100 is shown in FIG. 1, which depicts content management system 102 interacting with client device 114. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

Accounts

Content management system 102 can store content items in association with accounts, as well as perform a variety of content item management tasks, such as retrieve, modify, browse, and/or share the content item(s). Furthermore, content management system 102 can enable an account to access content item(s) from multiple client devices.

Content management system 102 supports a plurality of accounts. A subject (user, group, team, company, etc.) can create an account with content management system.

Content Item Storage

A feature of content management system 102 is the storage of content items, which can be stored in content item storage 110. A content item generally is any entity that can be recorded in a file system. Content items can be any object including digital data such as documents, collaboration content items, text files, audio files, image files, video files, webpages, executable files, binary files, content item directories, folders, zip files, playlists, albums, symlinks, cloud docs, mounts, placeholder content items referencing other content items in content management system 102 or in other content management systems, etc.

In some embodiments, content items can be grouped into a collection, which can refer to a folder including a plurality of content items, or a plurality of content items that are related or grouped by a common attribute.

In some embodiments, content item storage 110 is combined with other types of storage or databases to handle specific functions. Content item storage 110 can store content items, while metadata regarding the content items can be stored in a metadata database. Likewise, data regarding where a content item is stored in content item storage 110 can be stored in content item block database 112. Thus, content management system 102 may include more or less storages and/or databases than shown in FIG. 1.

In some embodiments, content item storage 110 is associated with at least one content item storage service 106, which includes software or other processor executable instructions for managing the storage of content items including, but not limited to, receiving content items for storage, preparing content items for storage, selecting a storage location for the content item, retrieving content items from storage, etc. In some embodiments, content item storage service 106 can divide a content item into smaller chunks for storage at content item storage 110. The location of each chunk making up a content item can be recorded in content item block database 112. Content item block database 112 can include a content entry for each content item stored in content item storage 110. The content entry can be associated with a content item ID, which uniquely identifies a content item.

In some embodiments, content items and chunks of content items can also be identified from a deterministic hash function. This method of identifying a content item and chunks of content items can ensure that content item duplicates are recognized as such since the deterministic hash function will output the same hash for every copy of the same content item, but will output a different hash for a different content item. Using this methodology, content item storage service 106 can output a unique hash for each different version of a content item.

Content item storage service 106 can also designate or record a parent of a content item or a content path for a content item. The content path can include the name of the content item and/or folder hierarchy associated with the content item. For example, the content path can include a folder or path of folders in which the content item is stored in a local file system on a client device. In some embodiments, content item database might only store a direct ancestor or direct child of any content item, which allows a full path for a content item to be derived, and can be more efficient than storing the whole path for a content item.

While content items are stored in content item storage 110 in blocks and may not be stored under a tree like directory structure, such directory structure is a comfortable navigation structure for subjects viewing content items. Content item storage service 106 can define or record a content path for a content item wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. As addressed above, the directory structure is merely a comfortable navigation structure for subjects viewing content items, but does not correlate to storage locations of content items in content item storage 110.

While the directory structure in which an account views content items does not correlate to storage locations of the content items at content management system 102, the directory structure can correlate to storage locations of the content items on client device 114 depending on the file system used by client device 114.

As addressed above, a content entry in content item block database 112 can also include the location of each chunk making up a content item. More specifically, the content entry can include content pointers that identify the location in content item storage 110 of the chunks that make up the content item.

Content item storage service 106 can decrease the amount of storage space required by identifying duplicate content items or duplicate blocks that make up a content item or versions of a content item. Instead of storing multiple copies, content item storage 110 can store a single copy of the content item or block of the content item, and content item block database 112 can include a pointer or other mechanism to link the duplicates to the single copy.

Content item storage service 106 can also store metadata describing content items, content item types, folders, file path, and/or the relationship of content items to various accounts, collections, or groups, in association with the content item ID of the content item.

Content item storage service 106 can also store a log of data regarding changes, access, etc.

Content Item Synchronization

Another feature of content management system 102 is synchronization of content items with at least one client device 114. Client devices 114 can take different forms and have different capabilities. For example, client device 114 can be a computing device having a local file system accessible by multiple applications resident thereon. Client device 114 can be a computing device wherein content items are only accessible to a specific application or by permission given by the specific application, and the content items are typically stored either in an application specific space or in the cloud. Client device 114 can be any client device accessing content management system 102 via a web browser and accessing content items via a web interface. While example client device 114 is depicted in form factors such as a laptop, mobile device, or web browser, it should be understood that the descriptions thereof are not limited to devices of these example form factors. For example, a mobile device might have a local file system accessible by multiple applications resident thereon or might access content management system 102 via a web browser. As such, the form factor should not be considered limiting when considering client device 114's capabilities. One or more functions described herein with respect to client device 114 may or may not be available on every client device depending on the specific capabilities of the device—the file access model being one such capability.

In many embodiments, client devices 114 are associated with an account of content management system 102, but in some embodiments client device 114 can access content using shared links and do not require an account.

As noted above, some client devices can access content management system 102 using a web browser. However, client devices can also access content management system 102 using client application 116 stored and running on client device 114. Client application 116 can include a client synchronization service 118.

Client synchronization service 118 can be in communication with server synchronization service 104 to synchronize changes to content items between client device 114 and content management system 102.

Client device 114 can synchronize content with content management system 102 via client synchronization service 118. The synchronization can be platform agnostic. That is, content can be synchronized across multiple client devices of varying types, capabilities, operating systems, etc. Client synchronization service 118 can synchronize any changes (e.g., new, deleted, modified, copied, or moved content items) to content items in a designated location of a file system of client device 114.

Content items can be synchronized from client device 114 to content management system 102, and vice versa. In embodiments wherein synchronization is from client device 114 to content management system 102, a subject can manipulate content items directly from the file system of client device 114, while client synchronization service 118 can monitor directory on client device 114 for changes to files within the monitored folders.

When client synchronization service 118 detects a write, move, copy, or delete of content in a directory that it monitors, client synchronization service 118 can synchronize the changes to content item storage service 106. In some embodiments, client synchronization service 118 can perform some functions of content item storage service 106 including functions addressed above such as dividing the content item into blocks, hashing the content item to generate a unique identifier, etc. Client synchronization service 118 can index content within client storage index 120 and save the result in client storage index 120. Indexing can include storing paths plus the content item identifier, and a unique identifier for each content item. In some embodiments, client synchronization service 118 learns the content item identifier from server synchronization service 104, and learns the unique client identifier from the operating system of client device 114.

Client synchronization service 118 can use storage index 120 to facilitate the synchronization of at least a portion of the content items within client storage with content items associated with a subject account on content management system 102. For example, client synchronization service 118 can compare storage index 120 with content management system 102 and detect differences between content on client storage and content associated with a subject account on content management system 102. Client synchronization service 118 can then attempt to reconcile differences by uploading, downloading, modifying, and deleting content on client storage as appropriate.

In some embodiments, storage index 120 stores tree data structures wherein one tree reflects the latest representation of a directory according to server synchronization service 104, while another tree reflects the latest representation of the directory according to client synchronization service 118. Client synchronization service 118 can work to ensure that the tree structures match by requesting data from server synchronization service 104 or committing changes on client device 114 to content management system 102.

Sometimes client device 114 might not have a network connection available. In this scenario, client synchronization service 118 can monitor the linked collection for content item changes and queue those changes for later synchronization to content management system 102 when a network connection is available. Similarly, a subject can manually start, stop, pause, or resume synchronization with content management system 102.

Client synchronization service 118 can synchronize all content associated with a particular subject account on content management system 102. Alternatively, client synchronization service 118 can selectively synchronize some of the content items associated with the particular subject account on content management system 102. Selectively synchronizing only some of the content items can preserve space on client device 114 and save bandwidth.

In some embodiments, client synchronization service 118 selectively stores a portion of the content items associated with the particular subject account and stores placeholder content items in client storage for the remainder portion of the content items. For example, client synchronization service 118 can store a placeholder content item that has the same filename, path, extension, metadata, of its respective complete content item on content management system 102, but lacking the data of the complete content item. The placeholder content item can be a few bytes or less in size while the respective complete content item might be significantly larger. After client device 114 attempts to access the content item, client synchronization service 118 can retrieve the data of the content item from content management system 102 and provide the complete content item to client device 114. This approach can provide significant space and bandwidth savings while still providing full access to a subject's content items on content management system 102.

While the synchronization embodiments addressed above referred to client device 114 and a server of content management system 102, it should be appreciated by those of ordinary skill in the art that a user account can have any number of client devices 114 all synchronizing content items with content management system 102, such that changes to a content item on any one client device 114 can propagate to other client devices 114 through their respective synchronization with content management system 102.

Content Item Access

Content item storage service 106 can receive a token from client application 116 that follows a request to access a content item and can return the capabilities permitted to the subject account.

In some embodiments, one or more of the services or storages/databases discussed above can be accessed using public or private application programming interfaces.

Certain software applications can access content item storage 110 via an API on behalf of a subject. For example, a software package such as an application running on client device 114, can programmatically make API calls directly to content management system 102 when a subject provides authentication credentials, to read, write, create, delete, share, or otherwise manipulate content.

A subject can view or manipulate content stored in a subject account via a web interface generated and served by web interface service 108. For example, the subject can navigate in a web browser to a web address provided by content management system 102. Changes or updates to content in the content item storage 110 made through the web interface, such as uploading a new version of a content item, can be propagated back to other client devices associated with the subject's account. For example, multiple client devices, each with their own client software, can be associated with a single account and content items in the account can be synchronized between each of the multiple client devices.

Client device 114 can connect to content management system 102 on behalf of a subject. A subject can directly interact with client device 114, for example when client device 114 is a desktop or laptop computer, phone, television, internet-of-things device, etc. Alternatively or additionally, client device 114 can act on behalf of the subject without the subject having physical access to client device 114, for example when client device 114 is a server.

Some features of client device 114 are enabled by an application installed on client device 114. In some embodiments, the application can include a content management system specific component. For example, the content management system specific component can be a stand-alone client application 116, one or more application plug-ins, and/or a browser extension. However, the subject can also interact with content management system 102 via a third-party application, such as a web browser, that resides on client device 114 and is configured to communicate with content management system 102. In various implementations, the client application 116 can present a subject interface (UI) for a subject to interact with content management system 102. For example, the subject can interact with the content management system 102 via a file system explorer integrated with the file system or via a webpage displayed using a web browser application.

In some embodiments, client application 116 can be configured to manage and synchronize content for more than one account of content management system 102. In such embodiments client application 116 can remain logged into multiple accounts and provide normal services for the multiple accounts. In some embodiments, each account can appear as folder in a file system, and all content items within that folder can be synchronized with content management system 102. In some embodiments, client application 116 can include a selector to choose one of the multiple accounts to be the primary account or default account.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural system configuration 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural system configuration 100 is simply one possible configuration and that other configurations with more or fewer components are possible.

Data Centers

Figure 2:
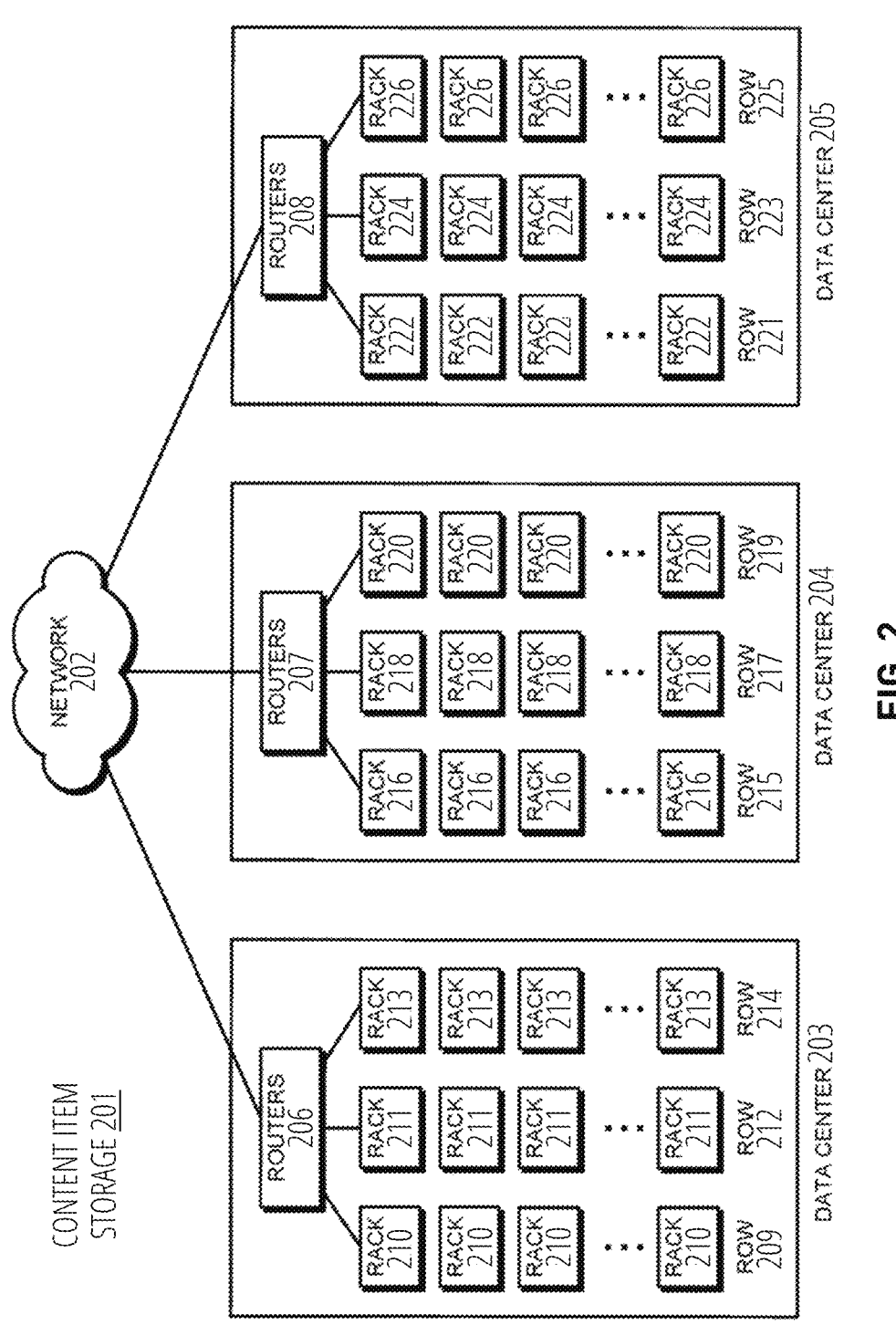
FIG. 2 illustrates a set of data centers in accordance with some embodiments of the present technology.

FIG. 2 illustrates an exemplary content item storage 201 that comprises a set of data centers 203, 204, and 205 in accordance with the disclosed embodiments. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

Data centers provide the infrastructure for the content item storage 201. Note that content item storage 201 can be smaller than the system illustrated in FIG. 2. (For example, content item storage 201 can comprise a single server that is connected to a number of disk drives, a single rack that houses a number of servers, a row of racks, or a single data center with multiple rows of racks.) As illustrated in FIG. 2, content item storage 201 can include a set of geographically distributed data centers 203-205 that may be located in different states, different countries or even on different continents.

Data centers 203-205 are coupled together through a network 202, wherein network 202 can be a private network with dedicated communication links, or a public network, such as the Internet, or a virtual-private network (VPN) that operates over a public network.

Communications to each data center pass through a set of routers that route the communications to specific storage nodes within each data center. More specifically, communications with data center 203 pass through routers 206, communications with data center 204 pass through routers 207, and communications with data center 205 pass through routers 208.

As illustrated in FIG. 2, routers 206-208 channel communications to storage devices within the data centers, wherein the storage devices are incorporated into servers that are housed in racks, wherein the racks are organized into rows within each data center. For example, the racks within data center 203 are organized into row 209, 212 and 214, wherein row 209 includes racks 210, row 212 includes racks 211 and row 214 includes racks 213. The racks within data center 204 are organized into row 215, row 217 and row 219, wherein row 215 includes racks 216, row 217 includes racks 218 and row 219 includes racks 220. Finally, the racks within data center 205 are organized into row 221, row 223 and row 225, wherein row 221 includes racks 222, row 223 includes racks 224 and row 225 includes racks rack 226.

As illustrated in FIG. 2, content item storage 201 is organized hierarchically, comprising multiple data centers, wherein machines within each data center are organized into rows, wherein each row includes one or more racks, wherein each rack includes one or more servers, and wherein each server (also referred to as an "object storage device" (OSD)) includes one or more storage devices (e.g., disk drives).

Data Storage System

Figure 3:
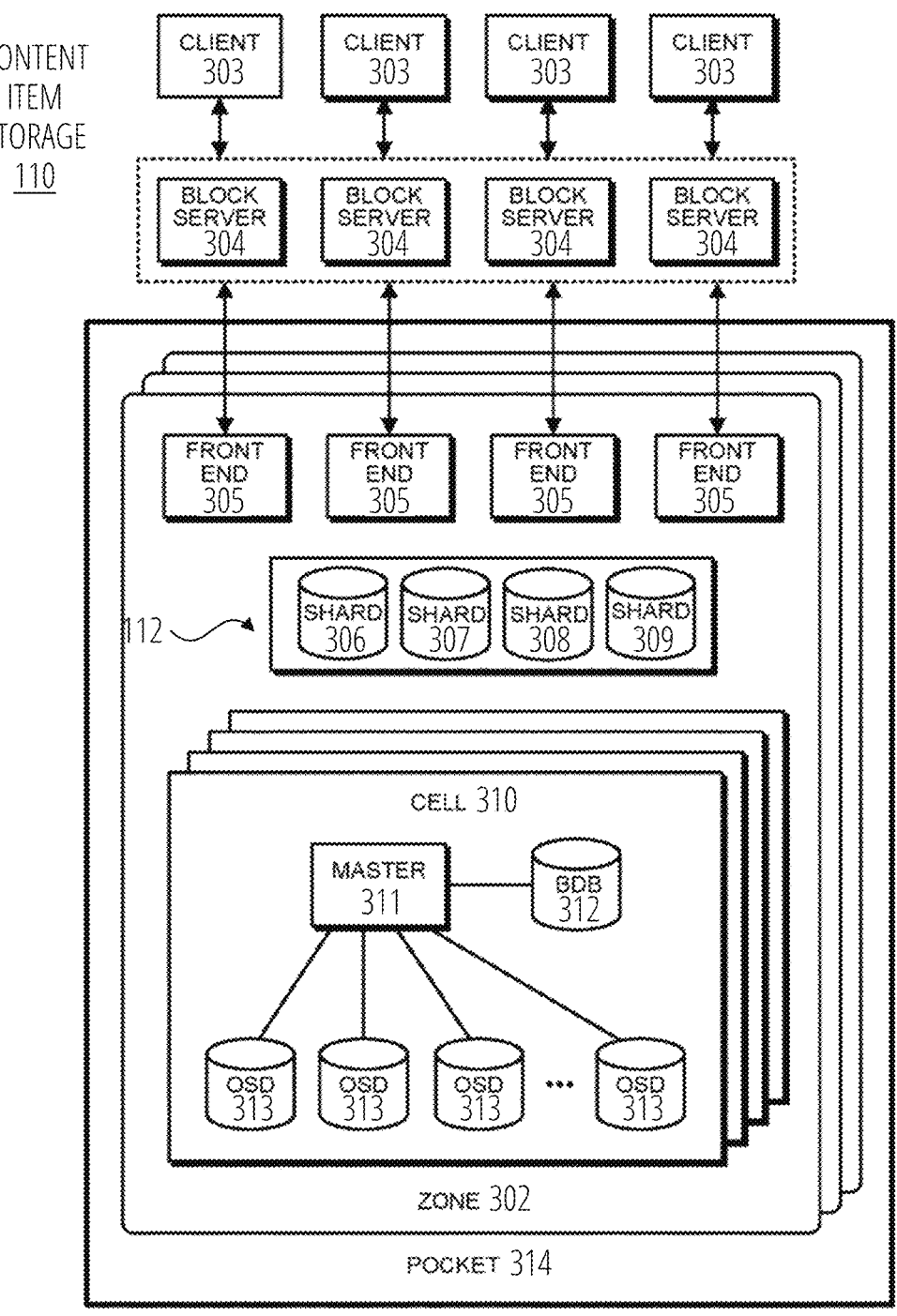
FIG. 3 illustrates the logical structure of the data storage system in accordance with some embodiments of the present technology.

FIG. 3 illustrates the logical structure of the content item storage 110 in accordance with the disclosed embodiments. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

As illustrated in FIG. 3, content item storage 110 includes a logical entity called a "pocket" 314 that, in some embodiments, is similar to an Amazon S3™ bucket. The pockets are distinct. For example, in an exemplary implementation, the system provides a "block storage pocket" to store data files, and a "thumbnail pocket" to store thumbnail images for data objects. Applications, such as client application 116, specify which pockets are to be accessed.

Within a pocket one or more "zones" exist that are associated with physical data centers, and these physical data centers can reside at different geographic locations. For example, one data center might be located in California, another data center might be located in Virginia, and another data center might be located in Europe. For fault-tolerance purposes, data can be stored redundantly by maintaining multiple copies of the data on different servers within a single data center and also across multiple data centers.

For example, when a data item first enters a data center, it can be initially replicated to improve availability and provide fault tolerance. It can then be asynchronously propagated to other data centers.

Note that storing the data redundantly can simply involve making copies of data items, or alternatively using a more space-efficient encoding scheme, such as erasure codes (e.g., Reed-Solomon codes) or Hamming codes to provide fault tolerance.

Within zones (such as zone 302 in FIG. 3), there exists a set of storage front ends 305, a content item block database content item block database 112 and a set of "cells," such as cell 310 illustrated in FIG. 3. A typical cell 310 includes a number of object storage devices 313, wherein the individual object storage devices 313 include storage devices that actually store data blocks. Cell 310 also includes a storage master 311, which is in charge of managing object storage devices 313 and bucket database 312, described in more detail below. (Note that content item block database 112 and bucket database 312 are logical databases which can be stored redundantly in multiple physical databases to provide fault tolerance.)

Storage master 311 performs a number of actions. For example, storage master 311 can determine how many writeable buckets the system has at any point in time. If the system runs out of buckets, storage master 311 can create new buckets and allocate them to the storage devices. Storage master 311 can also monitor object storage devices 313 and associated storage devices, and if any object storage device 313 or other storage device fails, storage master 311 can migrate the associated buckets to other object storage devices. In some embodiments, storage master 311 is a service which coordinates all volume operations in a pocket 314 cell 310.

As illustrated in FIG. 3, a number of block servers 304, which are typically located in a data center associated with a zone, can service requests from a number of clients 303. For example, a client 303, such as client device 114, can comprise applications running on client machines and/or devices that access data items in content item storage 110. Block servers 304 in turn forward the requests to storage front end 305 that are located within specific zones, such as zone 302 illustrated in FIG. 3. Note that clients 303 communicate with storage front end 305 through block servers 304, and the storage front ends 305 are the only machines within the zones that have public IP addresses.

Content items to be stored in content item storage 110 comprise one or more data blocks that are individually stored in content item storage 110. For example, a large file can be associated with multiple data blocks, wherein each data block is 1 MB to 4 MBs in size.

Moreover, each data block is associated with a "hash" that serves as a global identifier for the data block. The hash can be computed from the data block by running the data block through a hash function, such as a SHA-256 hash function. (The SHA-256 hash function is defined as a Federal Information Processing Standard (FIPS) by the U.S. National Institute of Standards and Technology (NIST).) The hash is used by content item storage 110 to determine where the associated data block is stored.

Get( ) Operation

The system performs a number of operations while processing data accesses on behalf of a client 303. For example, when a get( ) operation is received along with an associated hash, the hash is used to perform a lookup in content item block database 112. This lookup returns an identifier for a "bucket" and associated cell where the data block is stored.

To streamline failure-recovery operations, a large number of data blocks can be aggregated into larger buckets. For example, a number of 1-4 MB data blocks can be aggregated into a single 1 GiB bucket, wherein each bucket is stored in a specific cell. This enables the system to manipulate a small number of buckets during a failure-recovery operation instead of manipulating a large number of individual data blocks. Aggregating data blocks into buckets also greatly decreases the amount of metadata the system has to maintain and manipulate; this is advantageous because metadata is computationally expensive to maintain and manipulate.

Because a large number of data blocks can exist in content item storage 110, content item block database 112 can potentially be very large. If content item block database 112 is very large, it is advantageous to structure content item block database 112 as a "sharded" database. For example, when performing a lookup based on a hash in content item block database 112, the first 8 bits of the hash can be used to associate the hash with one of 256 possible shards, and this shard can be used to direct the lookup to an associated instance of content item block database 112. For example, as illustrated in FIG. 3, content item block database 112 can comprise 4 instance 306, 307, 308, and 309, wherein instance 306 is associated with shards 1-64, instance 307 is associated with shards 65-128, instance 308 is associated with shards 129-192 and instance 309 is associated with shards 193-256. In other embodiments, content item block database 112 can be divided into more or fewer instances. (Note that a zone can include a "ZooKeeper™ cluster" that is responsible for mapping shards to specific target cells and also mapping shards to physical content item block database machines.)

In some embodiments, content item block database 112 identifies where in Pocket 314 each block is located (e.g., mapping from the block's key to the cell 310 and Bucket ID, which is recording in bucket database 312.

Content item block database 112 instance 306-309 are logical databases that are mapped to physical databases, and to provide fault tolerance, each logical database can be redundantly stored in multiple physical databases. For example, in one embodiment, each content item block database 112 instance maps to three physical databases. If content item storage 110 is very large (for example containing trillions of data blocks), content item block database 112 will be too large to fit in random-access memory. In this case, content item block database 112 will mainly be stored in non-volatile storage, which for example, can comprise flash drives or disk drives.

In some embodiment, bucket database 312 identifies the object storage device holding each bucket of blocks, and which buckets are in which volumes. A bucket is a logical grouping of blocks. And a volume is a mapping from one or more buckets to the object storage devices storing them.

After the bucket and associated cell are identified for the get( ) operation, the system performs a lookup in bucket database 312 in the associated cell 310. This lookup returns an identifier for an object storage device 313 where the bucket is located. Note that because each bucket is fairly large (e.g., 1 gibibytes) and contains a large number of data blocks, bucket database 312 is relatively small and can typically be stored in random-access memory, which greatly speeds up the lookup process.

Finally, within the object storage device 313, the system performs a lookup based on the bucket and the hash to determine an offset and a length for the data block in a write-ahead log that stores data blocks for the bucket. The system then returns the data block from the determined offset in the write-ahead log. Note that because content item storage 110 is designed to store "immutable data" that generally does not change after it is written, it is efficient to store the immutable data in a write-ahead log, as opposed to a random-access structure. Because the data is rarely overwritten, writes do not require more complex and time-consuming random-access lookup mechanisms.

Put( ) Operation

During a put( ) operation, the system receives a data block to be written from a client. To process the put( ) operation, the system first computes a hash from the data block, for example using the SHA-256 technique described above. Next, the system selects a writeable bucket and an associated cell for the data block. Note that storage front ends 305 periodically poll the bucket databases 312 to identify and then cache writeable buckets. This enables storage front end storage front ends 305 to keep track of a number of buckets (e.g., 10 to 100 buckets) that they know are writeable at any given time. Then, when a put( ) operation is subsequently received, a front end simply selects a cached bucket that it knows is writable.

Within the associated cell, the system uses an identifier for the selected bucket to perform a lookup in the bucket database 312. This lookup returns one or more object storage devices 313 for the bucket. (Note that the bucket may be replicated across multiple object storage devices 313 to provide fault tolerance.) Within the object storage devices 313, the system appends the data block to a write-ahead log that stores data blocks for the bucket. After the data is stably written to the object storage devices 313, the system writes the hash-to-bucket mapping to the content item block database 112.

Note that the storage master 311 modifies the bucket database 312 and the storage front end 305 modifies the content item block database 112. In general, storage master 311 is concerned with reliability of storage, and hence performs operations to facilitate redundancy and rebalancing, while the storage front end 305 is generally concerned with finding information and simply maps hashes to logical constructs, such as buckets.

Storage master 311 performs various operations to detect and handle failures. More specifically, storage master 311 periodically performs health checks on object storage devices. If storage master 311 detects a failure in an object storage device 313, the associated buckets are degraded and the master sets the buckets to be non-writable. Note that get( ) operations have to access the buckets where the blocks are stored, but put( ) operations can be directed to any bucket that is currently writeable, so when a problem happens with a bucket, the system simply marks the bucket as non-writeable. The system can continue performing get( ) operations on the degraded bucket, because there exist multiple copies of the degraded bucket.

To handle a failure associated with a bucket, storage master 311 tells the associated object storage devices 313 to freeze the bucket. Storage master 311 then tells the object storage devices 313 to replicate the bucket to a new object storage device 313. The system then adds the new object storage device 313 to the cluster, increments the generation number for the object storage device 313, and marks the bucket as writeable. (Note that when a degraded object storage device 313 is restarted after a failure, it will not accept any reads because its generation number is old.) The system guarantees that every object storage device 313 in the current generation has valid data.

The system also includes mechanisms to perform compaction operations. Although the data stored in content item storage 110 is immutable, the system often needs to delete data items when users remove them from the system. In some embodiments, the system tracks deleted data items in a log, and when the usable storage in a given bucket falls below a threshold, the system compacts the bucket.

Object Storage Device

Figure 4:
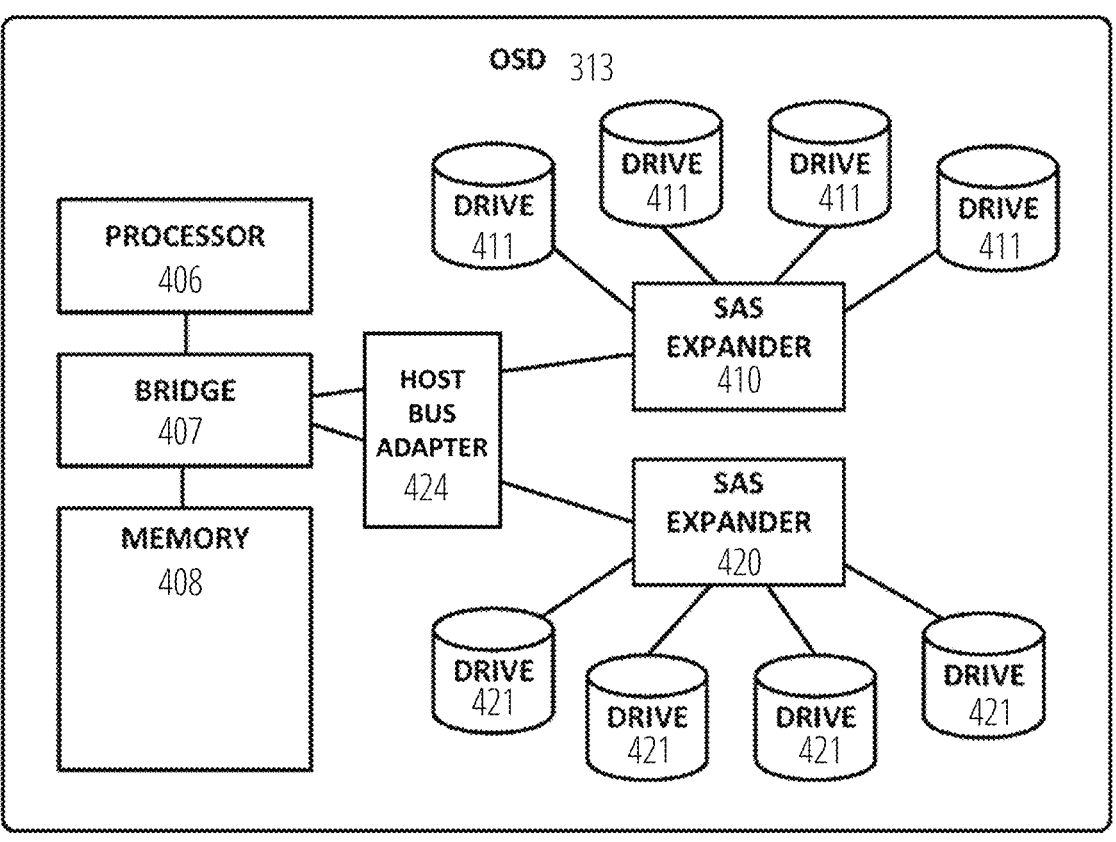
FIG. 4 illustrates the structure of an object storage device in accordance with some embodiments of the present technology.

FIG. 4 illustrates the structure of an exemplary object storage device 313 in accordance with the disclosed embodiments. As illustrated in FIG. 4, object storage device 313 includes a processor 406 that is connected to a memory 408 through a bridge 407. Processor 406 is also coupled to Serial Attached SCSI (SAS) expander 410 and SAS expander 420 via host bus adapter (HBA) 424, where SAS expander 410 is coupled to disk drives 411 and SAS expander 420 is coupled to disk drives 421. (Note that SAS expanders 410 and 420 may be coupled to more or fewer disk drives.) Also, note that a failure in object storage device 313 can involve a failure of a single one of the disk drives disk drive 411 or disk drives 421, or a failure that affects all or most of object storage device 313, such as a failure in processor 406, bridge 407, memory 408, SAS expanders 410 and 420 or one of the associated data paths.

System Architecture

Figure 5A:
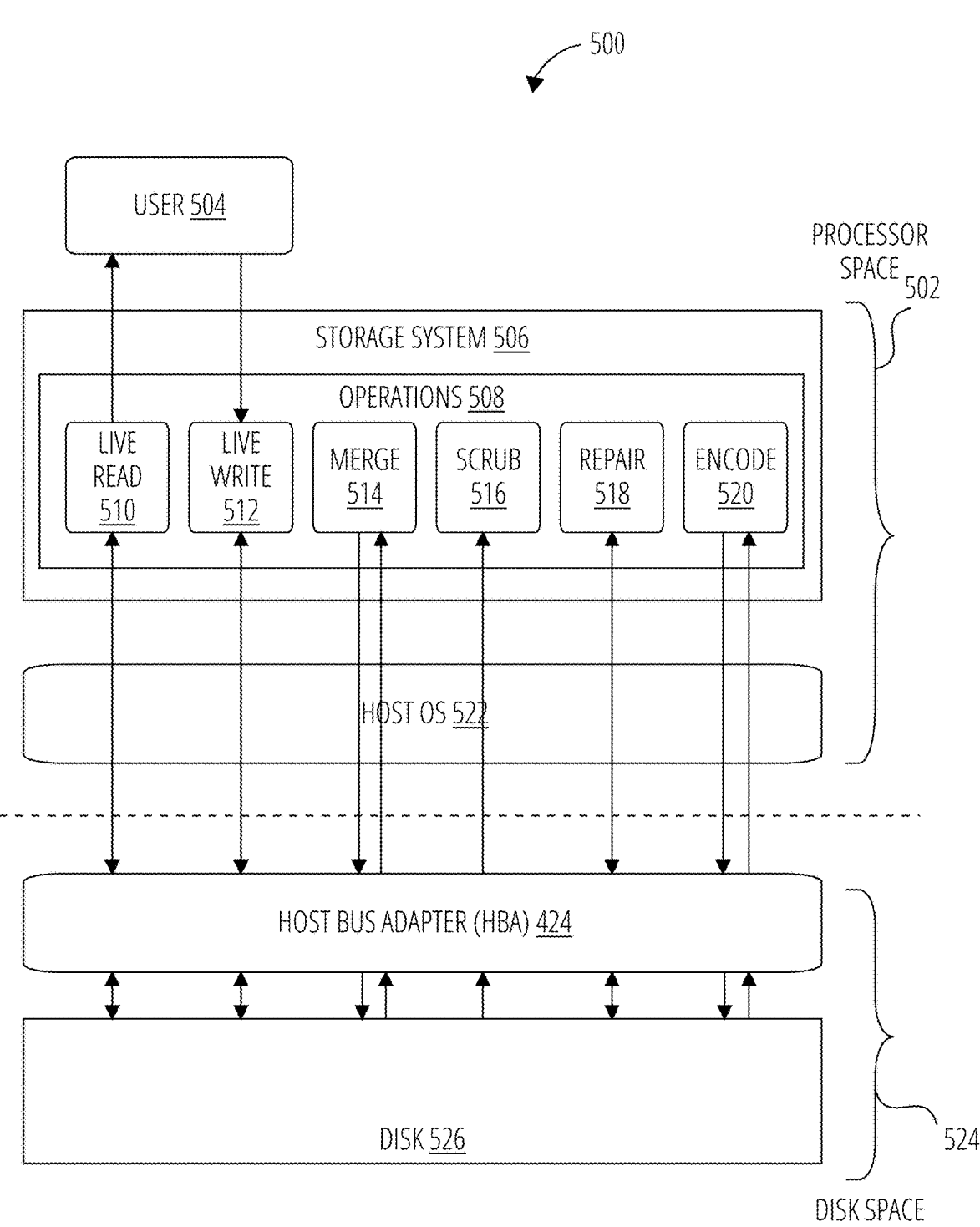
FIG. 5A illustrates a block diagram of an example data storage system that uses reads and writes to a host to perform a merge operation in accordance with some embodiments of the present technology.

FIG. 5A illustrates a non-limiting example of system 500, which includes processor space 502 and disk space 524. For example, disk space 524 can include a hard disk and controller (e.g., disk drive 421 in FIG. 4), and processor space 502 can include all other parts of system 500. For example, in FIG. 4, processor space 502 can include processor 406, bridge 407, and memory 408, and, in FIG. 3, processor space 502 can include storage master 311, bucket database 312, storage front end 305, and block server 304.

As shown in FIG. 5A, user 504 can use live write 512 to send data to be stored in remote storage, and user 504 can use live read 510 to retrieve data stored in remote storage (e.g., disk 526). The operations live read 510 and live write 512 are part of a large set of operations 508 are managed by storage system 506. According to certain non-limiting examples, storage system 506 can be a MAGIG POCKET system by DROPBOX. In addition to live read 510 and live write 512, storage system 506 manages various other operations, including, e.g., merge 514, scrub 516, repair 518, and encode 520 operations. Each of these operations can be performed using different threads.

The arrows indicate the directions in which information is communicated for the respective operations. For live write 512, instructions to write the data are sent from user 504 to storage system 506 and then from storage system 506 to the host bus adapter (i.e., HBA 424) via a host operating system (i.e., host OS 522). Finally, write instructions are communicated from HBA 424 to disk 526, where the data is written to certain logical block addresses (LBAs). After writing the data to disk 526 the LBAs where the data was ultimately written are reported to HBA 424 and then relayed to storage system 506. Then the LBAs are communicated via host OS 522 to storage system 506, where they are recorded in a database that can later be used to look up the address from which the data can be retrieved.

Similarly, the live read 510 involves communications in both directions between storage system 506 and HBA 424 and communications in both directions between HBA 424 and disk 526. For example, the read instructions together with the LBAs of the data are communicated in the downward direction, and the data that was read from disk 526 is communicated in the upward direction.

As indicated by the use of two sets of arrows for merge 514 and encode 520, some of operations 508 involve both reading from and writing to disk 526, as opposed to only reading or writing to disk 526, For example, encode 520 can include reading data from disk 526 to storage system 506 where the data is encoded, e.g., using erasure coding, and then writing the encoded data back to disk 526. Additionally, merge 514 can include moving data from a source address to a destination address by reading data from the source address on disk 526, and then writing the data to the destination address on disk 526. This combination of read and write operations involves the data passing through storage system 506.

According to certain non-limiting examples, disk 526 can be more than one physical disk, such that read and write operations can be to different physical disks encompassed within disk 526, or read/write operations can be from/to multiple disks physical disks encompassed within disk 526.

After data has been written to disk 526, scrub 616 can be used to periodically review the data for errors and perform error correction (e.g., using parity bits, checksums, error correcting codes, etc.). According to certain error correction schemes, single-bit errors in a data unit can be corrected but multi-bit errors cannot. Thus, by periodically applying scrub 516, the single-bit errors in data units of the stored data can be detected and corrected before the probability of multi-bit errors in the data unit becomes significant.

Repair 518 operations can be used to correct for failures of a disk or part of a disk. Consider a scenario in which one of the disks fails, and the data is constructed in units of 12 data bits, two parity bits, and two global parity bits. When one disk fails and each component resides on only one disk, repair 518 can be used to reconstruct the data from the stack and write the reconstructed data back to another disk.

The operation encode 520 can be applied sometime after a live write 512 to protect the stored data. For example, erasure coding can be used to divide the data into fragments and then expand and encode redundant data pieces that are stored across a set of different locations or storage media.

The operation merge 514 can be used, e.g., to perform garbage collection. The operation merge 514 can be used for compaction when regions of the disk become sparsely populated with data. For example, a shingled magnetic recording (SMR) disk can include zones of 256 Mb. Originally all of the zones in a disk can be filled. Over time, the data in some zones can be partially deleted, and, in other zones, the data can be mostly deleted, such that the zones become sparsely populated. Merge 514 can be used to consolidate sparse data from many zones into a single zone or a few zones. This consolidation is achieved by moving the data from a source location (i.e., the many sparsely populated zones) to a destination location (i.e., the few consolidated zones). As illustrated by the arrows for merge 514, both read and write operations are used to move the data from the source location to the destination location. That is, a read operation is used to read the data from the source address on disk 526 to processor space 502. Then a write operation is used to write the data from processor space 502 to the write address on disk 526. Moving data from between locations on disk 526 using a combination of reading to and writing from processor space 502 is referred to herein as a "standard copy."

Using a standard copy for merge 514 has the disadvantage of using resources within processor space 502, resulting in those resources being unavailable for other processing tasks. The specific resources within processor space 502 that are required to perform the standard copy can depend on the details of how the read and write operations are performed. Regardless of these details, the standard copy always uses at least some resources in processor space 502.

For example, direct memory access (DMA) can be used to perform the read and write operations with reduced impact on the central processing unit (CPU). Even with the use of DMA, resources in processor space 502 are required to perform a standard copy. Without DMA, a standard copy can include the CPU using programmed input/output, in which case the CPU can be fully occupied for the entire duration of the read or write operation, making the CPU unavailable to perform other work. With DMA, the CPU can initiate the read/write, after which the CPU is free to perform other operations while the transfer is in progress. Upon completion of the read/write operation, the CPU receives an interrupt from the DMA controller (DMAC).

The processor-space resources consumed by merge 514 can be significant, especially when merge 514 occupies a large part of the workload of storage system 506.

Efficiency Improvement Using Internal Copy

Figure 5B:
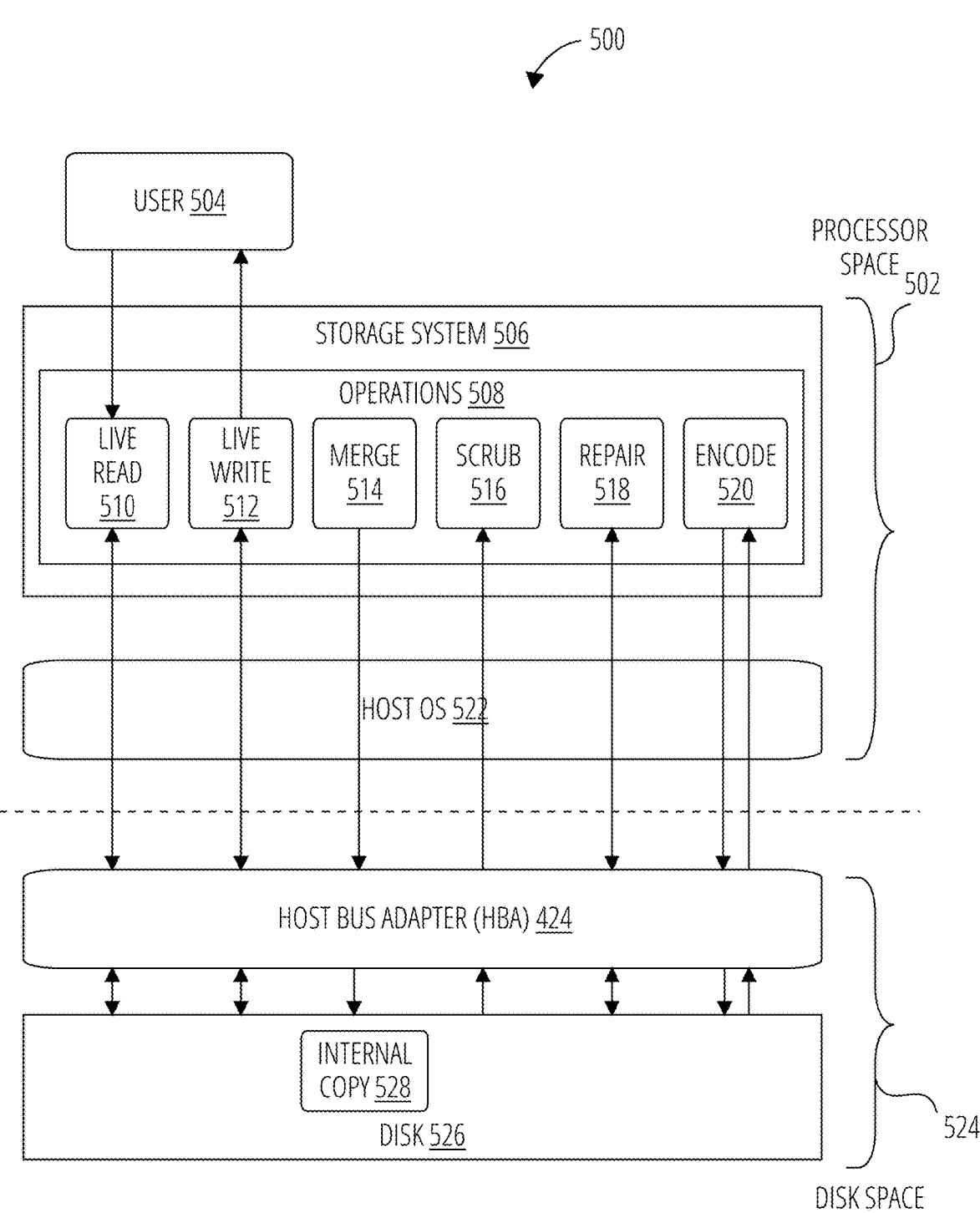
FIG. 5B illustrates a block diagram of an example data storage system that uses an internal copy function to perform a merge operation in accordance with some embodiments of the present technology.

FIG. 5B illustrates system 500 in which the merge 514 is performed using internal copy 528, rather than using a standard copy. Internal copy 528 can be used to move data when the source and destination addresses are on the same physical disk. Internal copy 528 is performed entirely on disk 526 without requiring resources from processor space 502 and without requiring resources from HBA 424. According to certain non-limiting examples, internal copy 528 can be performed, e.g., using a Serial Advanced Technology Attachment (SATA) "write gathered extend" command or using a Small Computer System Interface (SCSI) "extended copy" command.

As illustrated in FIG. 5B, storage system 506 initiates merge 514 by sending instructions from storage system 506 to HBA 424, wherein the instructions are to copy data from the source address to the destination address. HBA 424 then relays the instructions to disk 526. When the source and destination addresses are on the same physical disk, the instructions can include one or more indicia that merge 514 is performed using internal copy 528. When the source and destination addresses are on different physical disks, the merge 514 can be performed using a standard copy. Indicia that indicate whether merge 514 is to be performed using internal copy 528 or using a standard copy can be attached, for example, to the copy-request instructions. These indicia can be generated in response to a query regarding whether the source and destination addresses are on the same physical disk. The query whether the source and destination addresses are on the same physical disk can be performed in storage system 506, host OS 522, or HBA 424, for example. Alternatively or additionally, the query whether the source and destination addresses are on the same physical disk can be performed on disk 526, and when internal copy 528 is used for merge 514, disk 526 can signal to HBA 424 that merge 514 was performed internal copy 528, otherwise disk 526 returns the copied data, as illustrated in FIG. 5A.

In FIG. 5B, only merge 514 is illustrated as using internal copy 528. For example, live read 510 and live write 512 would not use a copy function because those operations include only a reading from or writing to disk 526—but not both reading and writing—and therefore live read 510 and live write 512 would not use internal copy 528. Although encode 520 involves both reading and writing, the data is modified in processor space 502 after reading and before writing, and therefore encode 520 would not use internal copy 528.

Although FIG. 5B illustrates only merge 514 using internal copy 528, the use of internal copy 528 is not limited to merge 514, and other operations by storage system 506 can use internal copy 528. For example, any operation that includes moving data between addresses on the same disk without modifying the data can be performed using internal copy 528.

Method of Using Internal Copy

Figure 6:
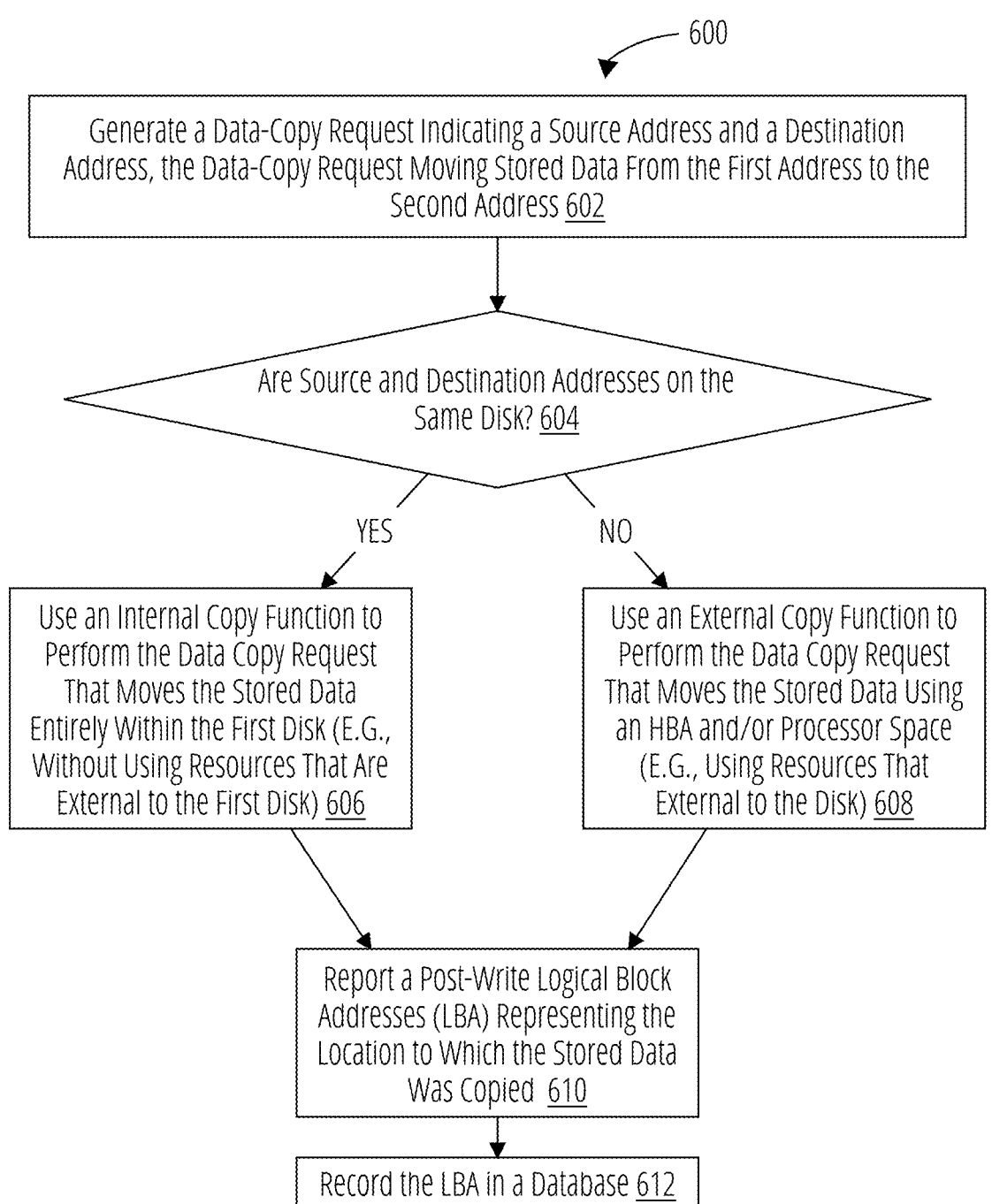
FIG. 6 illustrates a flow diagram of an example method using an internal copy function to move data within the same disk in accordance with some embodiments of the present technology.

FIG. 6 illustrates an example method 600 for efficiently moving data within a disk using internal copy 528. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to certain non-limiting examples, method 600 can be used to perform a merge operation 514 of operations 508. Additionally, method 600 can be used to perform operations other than merge 514 in which data is moved between addresses on the same disk without modifying the data.

According to some examples, in block 602, the method includes generating a data-copy request indicating a source address and a destination address. The data-copy request includes instructions to move stored data from the first address to the second address. For example, storage system 506 illustrated in FIG. 5A and FIG. 5B may generate a data-copy request indicating a source address and a destination address. The data-copy request moves stored data from the first address to the second address. The data-copy request can be part of merge 614 or another operation by storage system 606.

According to some examples, in decision block 604, the method includes inquiring whether source and destination addresses are on the same disk. For example, storage system 506 illustrated in FIG. 5A and FIG. 5B may determine whether the source and destination addresses are on the same disk. This query can be performed at any stage of the operation before the data copy is performed on disk 526. When the source and destination addresses are on the same disk, method 600 proceeds to block 606. Otherwise, method 600 proceeds to block 608.

According to some examples, in block 606, the method includes using an internal copy function to perform the data copy request that moves the stored data entirely within the first disk (e.g., without using resources that are external to the first disk). For example, the disk 526 illustrated in FIG. 5A and FIG. 5B may use an internal copy function to perform the data copy request that moves the stored data entirely within the first disk (e.g., without using resources that are external to the first disk).

According to some examples, in block 608, the method includes using a standard copy function to perform the data copy request that moves the stored data using an HBA and/or processor space (e.g., using resources that external to the disk). For example, processor space 502 illustrated in FIG. 5A and FIG. 5B may use a standard copy function to perform the data copy request that moves the stored data. In the standard copy, the stored data is read from a first physical disk of disk 628 to an off-disk location (e.g., the off-disk location can be a cache of a CPU, RAM, DMA, memory, an HBA, etc.), and the standard copy includes writing the stored data from the off-disk location to a location on a second physical disk of disk 628.

According to some examples, in block 610, the method includes reporting post-write logical block addresses (LBAs) representing the location to which the stored data was copied. For example, disk 526 illustrated in FIG. 5A and FIG. 5B may report to storage system 506 the post-write LBAs, which represent the location to which the stored data was copied. The exact LBA to which the data is written is determined by disk 628, and this LBA is then reported to storage system 606.

According to some examples, in block 612, the method includes recording the reported LBA in a database. For example, the storage system 506 illustrated in FIG. 5A and FIG. 5B may record the LBA in a database. The LBA reported to storage system 606 is recorded in a database, such that the stored data can later be retrieved from the LBA.

Disk Write Architecture

FIG. 7A illustrates disk write architecture 700a in which OSD threads 722 are added to an application-level disk IO queue 720 to be written to a hard disk. FIG. 7A illustrates a non-limiting case of four threads (e.g., thread 702a, thread 702b, thread 702c, and thread 702d). Each thread includes a sequence of input/output (IO) units. For example, thread 702a includes IO unit 704a, IO unit 704b, IO unit 704c, and IO unit 704d. Similarly, thread 702b includes IO unit 706a, IO unit 706b, IO unit 706c, and IO unit 706d. Similarly, thread 702c includes IO unit 708a, IO unit 708b, IO unit 708c, and IO unit 708d. Lastly, thread 702d includes IO unit 710a, IO unit 710b, IO unit 710c, and IO unit 710d.

The IO units for a given thread can vary in size and be assigned respective write addresses within the same zone. For example, the IO units of thread 702a are assigned write addresses in zone 10, thread 702b is assigned write addresses in zone 100, thread 702c is assigned write addresses in zone 500, thread 702d is assigned write addresses in zone 650. The IO units within a given thread can be assigned consecutive, sequential write addresses. For example, in thread 702a, the IO units are assigned sequential addresses, such that, IO unit 704a (size 4 k) is assigned to memory 0x5000000; IO unit 704b (size 8 k) is assigned to address 0x5001000; IO unit 704c (size 4 k) is assigned to memory 0x5003000; and IO unit 704d (size 4 k) is assigned to memory 0x5004000.

Disk write architecture 700b uses a first-in-first-out (FIFO) protocol. OSD mapped timeline 724 represents respective time intervals for writing the IO units to disk. The columns in OSD mapped timeline 724 (e.g., writes to first zone 712, writes to second zone 714, writes to third zone 716, and writes to fourth zone 718) represent the different zones to which the IO units are written. At time T0, the first IO unit in each of the OSD threads 722 is written to its corresponding zone on the disk. For example, first IO unit of thread 702a (i.e., IO unit 704a) is written to address 0x5000000 in zone 10, the first IO unit of thread 702b is written to address 0x3200000 in zone 100, the first IO unit of thread 702c is written to address 0xFA00000 in zone 500, and the first IO unit of thread 702d (i.e., IO unit 710a) is written to address 0x14400000 in zone 650. At time T1, the second IO unit in each of OSD threads 722 is written to its corresponding zone on the disk, and so forth.

A challenge of disk write architecture 700a is that, in each time interval, the disk head moves from zone 10 to zone 100 to zone 500 and then to zone 650 before moving back to zone 10 for the next time interval. The movement of the disk head between zones adds latency and seek time to the write operations to the disk.

Disk Write Architecture with Zone Append

Figure 7B:
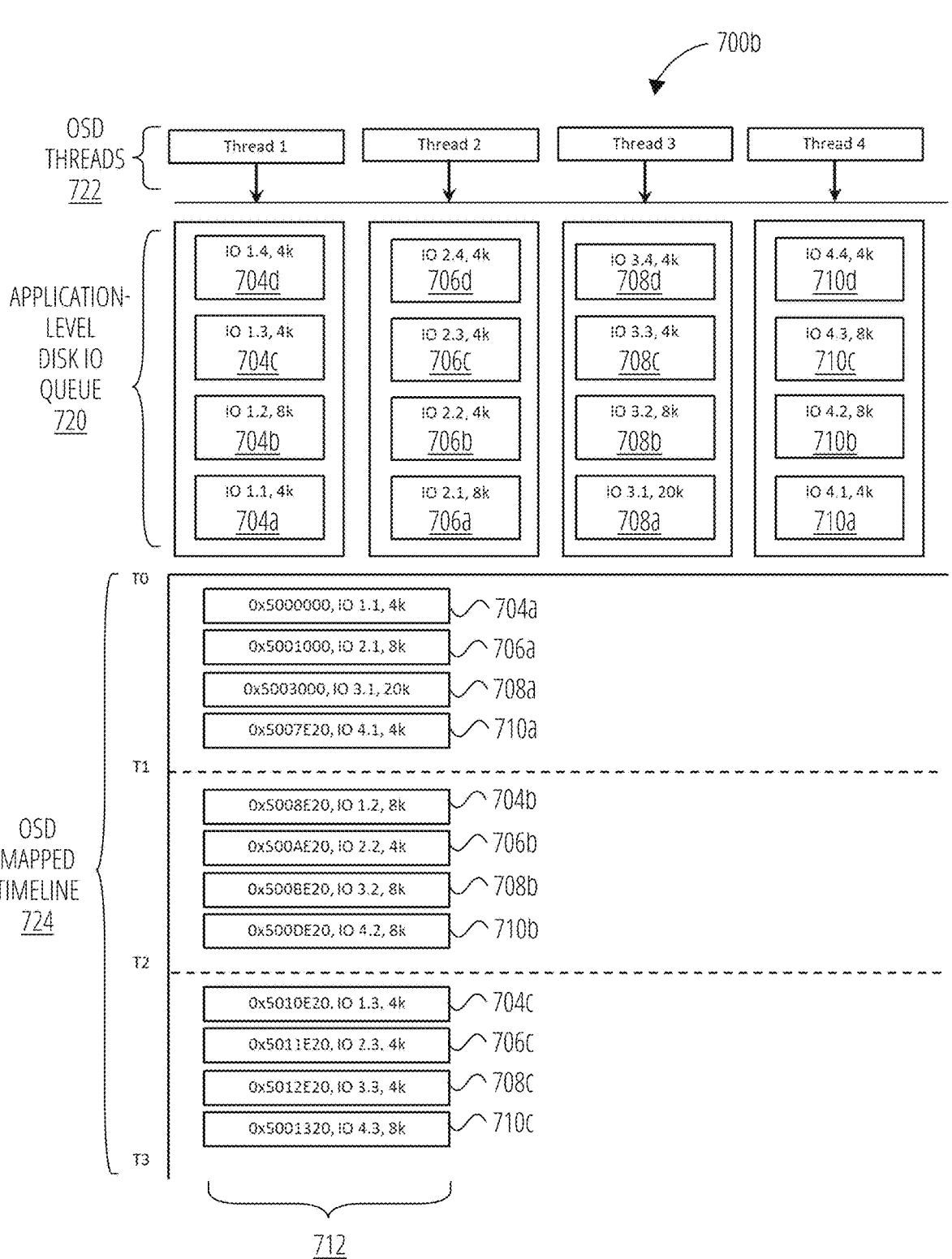
FIG. 7B illustrates a diagram of an example disk write architecture that writes threads to a common zone in accordance with some embodiments of the present technology.

In contrast to disk write architecture 700a, disk write architecture 700b shown in FIG. 7B reduces the latency and seek time for writing multiple threads to the disk. In FIG. 7B, OSD threads 722 include unnamed IO units. The unnamed IO units are assigned addresses when they are added to OSD mapped timeline 724. Accordingly, the IO units for all threads can be assigned to addressees in a common zone (e.g., zone 10). Although the IO units are unnamed, for reference in FIG. 7B, labels have been applied to the IO units to distinguish one IO unit from another, wherein "IO i.j" indicates the $j^{th}$ IO unit of the $i^{th}$ thread (e.g., "IO 2.3" indicates the third IO unit of the second thread).

FIG. 7B applies a FIFO protocol in which the first IO unit of each thread is added to the T0 interval of OSD mapped timeline 724 and assigned a write address in the common zone. For example, the first IO unit of the first thread (i.e., IO unit 704a) is assigned to address 0x5001000, the first IO unit of the second thread (i.e., IO unit 704a) is assigned to address 0x5001000, the first IO unit of the third thread (i.e., IO unit 708a) is assigned to address 0x5003000, and the first IO unit of the fourth thread (i.e., IO unit 710a) is assigned to address 0x5007E20. The IO units in OSD mapped timeline 724 can be assigned sequential write addresses.

The second IO units of the respective threads (e.g., IO unit 704b, IO unit 706b, IO unit 708b, and IO unit 710b) can be added to time interval T1 of OSD mapped timeline 724. Similarly, the third IO units of the respective threads (e.g., IO unit 704c, IO unit 706c, IO unit 708c, and IO unit 710c) can be added to time interval T2 of OSD mapped timeline 724, and so forth. Whereas for disk write architecture 700a, the queue depth of writes to first zone 712 per time interval is one, for disk write architecture 700b, the queue depth for writing to a zone will be a function of the number of threads.

Disk write architecture 700b has the benefit that even when the threads represent random write operations, the threads can be combined into a completely sequential write operation. By combining threads into sequential write operations in a common zone, the throughput of the write operations can be increased. For example, an increase from a throughput of 60 megabits per second (Mbps) to 250 Mbps has been observed by switching from disk write architecture 700a to disk write architecture 700b.

Method of Combining Threads to Write to a Common Zone

FIG. 8 illustrates an example method 800 for improving write efficiency by writing multiple threads to a common zone on a disk. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, in block 802, write instructions are received at a disk. The write instructions can include respective threads (e.g., a first thread and a second thread), and each thread includes instructions to write input-output (IO) units to the disk.

According to some examples, in block 804, the method includes appending the IO units of the threads to a write queue. In the write queue, IO units from the respective threads are combined and addressed to be written to a common zone. For example, the IO units of the first and second threads are appended to the write queue of a common zone, and the IO units of the first and second threads that arrive at the disk together are arranged sequentially in the same time interval of the mapped timeline of the queue.

According to some examples, in block 806, the method includes assigning respective write addresses to each of the IO units in the queue. Further, the write addresses can be sequential in accordance with an order to the IO units arranged in the mapped timeline of the queue. According to certain non-limiting examples, block 806 can be concurrent with block 804. Alternatively, block 806 can occur before or after block 804

According to some examples, in block 808, the method includes providing a post-write logical block address (LBA) representing the write addresses assigned to the IO units.

According to certain non-limiting examples, the disk can be an Object Storage Device (OSD) and the threads can be OSD threads.

According to certain non-limiting examples, the disk is a Serial Attached SCSI (SAS) disk and/or Serial Advanced Technology Attachment (SATA) disk. Additionally, the disk can be a shingled magnetic recording (SMR) disk. The disk has a head that moves, and writing to different zones requires moving the head from one zone to another zone.

According to certain non-limiting examples, a queue depth is proportional to the number of threads.

According to certain non-limiting examples, the write instructions are received within respective time intervals, such that one IO unit from each of the threads is received per time interval. Then, the IO units received within the same time interval (i.e., one IO unit per thread) are sequentially appended to the queue. That is, a subset of the IO units received during a same time interval are arranged as a consecutive sequence within the queue and assigned sequential addresses in the common zone.

Figure 9:
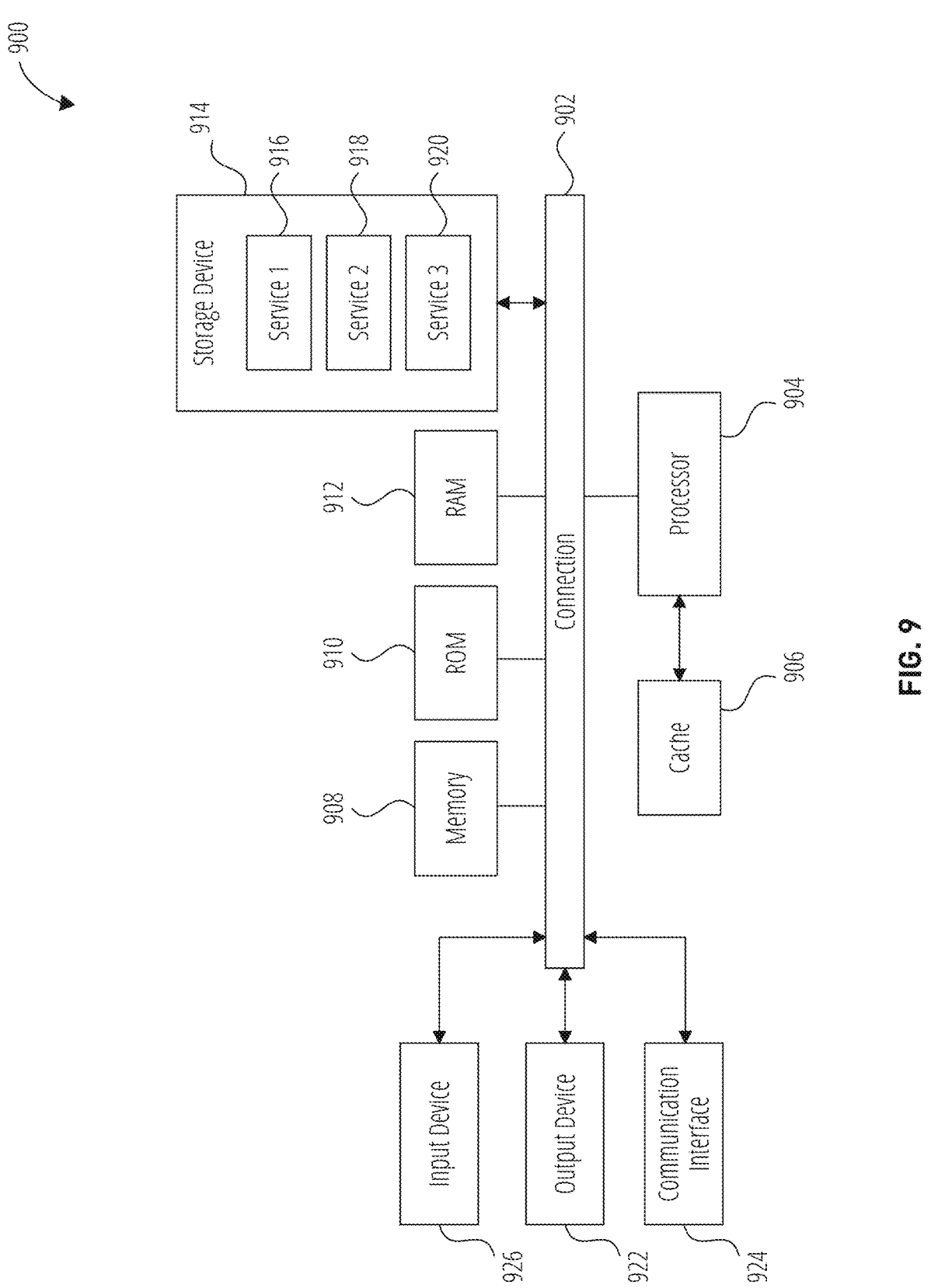
FIG. 9 illustrates a block diagram for an example of a computing device for implementing the methods, devices, and systems herein in accordance with some embodiments of the present technology.

FIG. 9 shows an example of computing system 900, which can be for example any computing device making up content item storage 110, or any component thereof in which the components of the system are in communication with each other using connection 902. Further, computing system 900 can be, e.g., any computing device making up object storage device 313, system 500, or disk write architecture 700b. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 and connection 902 that couples various system components including system memory 908, such as read-only memory (ROM) 910 and random-access memory (RAM) 912 to processor 904. Computing system 900 can include a cache of high-speed memory 906 connected directly with, in close proximity to, or integrated as part of processor 904.

Processor 904 can include any general-purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances, the present technology may be presented as including individual functional blocks including functional blocks comprising devices, device components, steps or methods in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data that cause or otherwise configure a general-purpose computer, special-purpose computer, or special-purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or methods in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspects

The present technology includes computer-readable storage mediums for storing instructions, and systems for executing any one of the methods embodied in the instructions addressed in the aspects of the present technology presented below:

Aspect 1. A method of writing to a computer disk, the method comprising: receiving, at a disk, write instructions including a plurality of threads for writing input-output (IO) units to the disk, the plurality of threads including a first thread and a second thread, the first thread comprising first instructions to write to the disk IO units of the first thread, and the second thread comprising second instructions to write to the disk IO units of the second thread, wherein arrival times of the IO units of the first thread overlap arrival times of the IO units of the second thread; appending the IO units of the plurality of threads to a same queue for writing to a common zone, wherein the IO units of each thread of the plurality of threads are appended to the same queue writing to the common zone; assigning, by the disk, write addresses in the common zone to the IO units appended to the same queue to write to the common zone; and providing, by the disk, a post-write logical block addresses (LBAs) representing the write addresses in the common zone to which the IO units were written.

Aspect 2. The method of any one of Aspect 1, further comprising: reporting, from the disk, post-write logical block addresses (LBAs) representing locations in the common zone where the IO units were written.

Aspect 3. The method of any one of Aspect 1-2, further comprising: receiving the write instructions at respective time intervals, one IO unit per thread of the plurality of threads being received per time interval; and appending the IO units of the plurality of threads sequentially to the queue such that a subset of the IO units received during a same time interval are arranged as a consecutive sequence within the queue and assigned sequential addresses in the common zone.

Aspect 4. The method of any one of Aspect 1-3, wherein the computer disk comprises: a plurality of zones, each zone of the plurality of zones including spatially abutting stored bits, and each zone being spatially separated from neighboring zones, and a head that moves from a first zone to a second zone when transitioning from writing to the first zone to writing to the second zone.

Aspect 5. The method of any one of Aspect 1-4, wherein a queue depth for writing to the common zone is proportional to a number of threads in the plurality of threads.

Aspect 6. The method of any one of Aspect 1-5, wherein the disk is a Small Computer System Interface (SCSI) disk, a Serial attached SCSI (SAS) disk, or a Serial Advanced Technology Attachment (SATA) disk.

Aspect 7. The method of any one of Aspect 1-6, wherein the write instructions are nameless write instructions that do not specify where the IO units are to be written.

Aspect 8. The method of any one of Aspect 1-7, wherein the IO units are not a uniform size.

Aspect 9. The method of any one of Aspect 1-8, wherein: the disk is an Object Storage Device (OSD) disk; and the plurality of threads are OSD threads.

Aspect 10. A method comprising: receiving, at a disk, an instruction from a processor to perform a data copy request, the data copy request moving stored data from a source address to a destination address, the source address and the destination address being on a first disk; and performing, at the first disk, the data copy request using an internal copy function that moves the stored data from the source address to the destination address, the internal copy function being performed entirely on the first disk without transferring the stored data off of the first disk.

Aspect 11. The method of any one of Aspect 10, wherein performing the data copy request using the internal copy further includes the internal copy function is performed without using resources of the processor and without using resources of a host bus adapter.

Aspect 12. The method of any one of Aspect 10-11, wherein performing the data copy request using the internal copy further includes the internal copy function is performed without using resources off of the first disk.

Aspect 13. The method of any one of Aspect 10-12, further comprising, upon completion of performing the data copy request, reporting, by the disk, a post-write logical block addresses (LBA) representing a location to which the stored data was copied.

Aspect 14. The method of any one of Aspect 10-13, wherein the instruction to perform the data copy request is a merge request on the first disk.

Aspect 15. The method of any one of Aspect 10-14, further comprising: determining, at the processor, whether the source address and the destination address are both on the first disk, and signaling from the processor to the first disk that the data copy request is to be performed using the internal copy function.

Aspect 16. The method of any one of Aspect 10-15, further comprising: signaling the data copy request from the processor to the first disk without indicating whether to use the internal copy function; and determining, at the first disk, to use the internal copy function to perform the data copy request based on the source address and the destination address both being on the first disk.

Aspect 17. The method of any one of Aspect 10-16, further comprising: receiving, at the disk, another instruction from the processor to perform another data copy request, the other data copy request moving other stored data from another source address on the first disk to another destination address on a second disk; performing the other data copy request using a copy function that moves the other stored data from the other source address to the other destination address by reading the other stored data from the first disk and writing the stored data to the second disk.

Aspect 18. The method of Aspect 17, wherein: the copy function reads the other stored data from the first disk to the processor and writes the stored data from the processor to the second disk; the copy function uses a direct access memory (DMA) controller to read the other stored data from the first disk and write the stored data from the processor to the second disk; and/or the copy function uses a host bus adapter (HBA) to read the other stored data from the first disk and write the stored data from the processor to the second disk.

What is claimed is:

1. A method of writing to a disk, the method comprising:
receiving, at the disk, nameless write instructions including a plurality of threads for writing disk input-output (IO) units to the disk, the plurality of threads including a first thread and a second thread, the first thread comprising first instructions to write to the disk IO units of the first thread, and the second thread comprising second instructions to write to the disk IO units of the second thread, wherein arrival times of the disk IO units of the first thread overlap arrival times of the disk IO units of the second thread, and wherein the nameless write instructions do not specify where the disk IO units are to be written;
determining, as the disk IO units of the plurality of threads are added to a write queue on the disk, a common zone for the disk IO units to be written;
assigning, by the disk, write addresses in the common zone to the disk IO units; and
providing, by the disk, a post-write logical block address (LBA) representing the write addresses in the common zone to which the disk IO units were written.

2. The method of claim 1, wherein providing the post-write LBA further comprises reporting, from the disk, the post-write LBA comprising locations in the common zone where the disk IO units were written.

3. The method of claim 1, wherein receiving the nameless write instructions further comprises:
receiving the nameless write instructions at respective time intervals, one disk IO unit per thread of the plurality of threads being received per time interval; and
appending the disk IO units of the plurality of threads sequentially to the write queue such that a subset of the disk IO units received during a same time interval are arranged as a consecutive sequence within the write queue and assigned sequential addresses in the common zone.

4. The method of claim 1, wherein the disk comprises:
a plurality of zones spatially separated from neighboring zones, each zone of the plurality of zones comprising spatially abutting stored bits; and
a head that moves from a first zone to a second zone when transitioning from writing to the first zone to writing to the second zone.

5. The method of claim 1, wherein determining the common zone further comprises adding the disk IO units to the write queue comprising a queue depth for writing to the common zone that is proportional to a number of threads in the plurality of threads.

6. The method of claim 1, wherein receiving the nameless write instructions further comprises receiving the nameless write instructions at the disk comprising a Small Computer System Interface (SCSI) disk, a Serial attached SCSI (SAS) disk, or a Serial Advanced Technology Attachment (SATA) disk.

7. The method of claim 1, further comprising:

receiving, at the disk, unnamed disk IO units; and assigning addresses to the unnamed disk IO units in the common zone as the disk IO units are added to an object storage device mapped timeline of the write queue.

8. The method of claim 1, wherein receiving the nameless write instructions further comprises:

receiving the nameless write instructions including the plurality of threads comprising object storage device threads at the disk comprising an object storage device.

9. The method of claim 1, wherein assigning the write addresses further comprises:

receiving, at the disk, an instruction from a processor to perform a data copy request, the data copy request requesting to move stored data from a source address to a destination address, the source address and the destination address being on the disk; and performing, at the disk, the data copy request using an internal copy function that moves the stored data from the source address to the destination address, the internal copy function being performed entirely on the disk without transferring the stored data off the disk.

10. The method of claim 9, wherein performing the data copy request using the internal copy function further comprises performing the internal copy function without using resources of the processor and without using resources of a host bus adapter.

11. The method of claim 9, further comprising:

determining, at the processor, whether the source address and the destination address are both on the disk, and signaling from the processor to the disk that the data copy request is to be performed using the internal copy function, when the source address and the destination address are determined to both on the disk.

12. The method of claim 9, further comprising, upon completion of performing the data copy request, reporting, by the disk, a post-write logical block addresses (LBA) representing a location to which the stored data was copied.

13. A non-transitory computer-readable storage medium, the computer-readable storage medium including instructions that when executed by one or more processors, cause the one or more processors to:

receive, at a disk, nameless write instructions including a plurality of threads for writing disk input-output (IO) units to the disk, wherein the nameless write instructions do not specify where the disk IO units are to be written;

determine, as the disk IO units of the plurality of threads are added to a write queue on the disk, a common zone for the disk IO units to be written;

assign, by the disk, write addresses in the common zone to the disk IO units; and provide, by the disk, a post-write logical block address (LBA) representing the write addresses assigned to the disk IO units in the write queue to write to the common zone.

14. The non-transitory computer-readable storage medium of claim 13, wherein the instructions further cause the one or more processors to provide the post-write LBA by:

reporting, from the disk, the post-write LBA comprising locations in the common zone where the disk IO units were written.

15. The non-transitory computer-readable storage medium of claim 13, wherein the instructions further cause the one or more processors to receive the nameless write instructions by:

receiving the nameless write instructions at respective time intervals, one disk IO unit per thread of the plurality of threads being received per time interval; and appending the disk IO units of the plurality of threads sequentially to the write queue such that a subset of the disk IO units received during a same time interval are arranged as a consecutive sequence within the write queue and assigned sequential addresses in the common zone.

16. The non-transitory computer-readable storage medium of claim 13, wherein the disk comprises:

a plurality of zones spatially separated from neighboring zones, each zone of the plurality of zones comprising spatially abutting stored bits; and a head that moves from a first zone to a second zone when transitioning from writing to the first zone to writing to the second zone.

17. The non-transitory computer-readable storage medium of claim 13, wherein:

determining the common zone further comprises adding the disk IO units to the write queue comprising a queue depth for writing to the common zone that is proportional to a number of threads in the plurality of threads.

18. A computing system comprising:

one or more processors; and a memory storing instructions that, when executed by the one or more processors, configure the computing system to:

receive, at a disk, nameless write instructions including a plurality of threads for writing disk input-output (IO) units to the disk, the plurality of threads including a first thread and a second thread, the first thread comprising first instructions to write to the disk IO units of the first thread, and the second thread comprising second instructions to write to the disk IO units of the second thread, wherein arrival times of the disk IO units of the first thread overlap arrival times of the disk IO units of the second thread, and wherein the nameless write instructions do not specify where the disk IO units are to be written;

determine, as the disk IO units of the plurality of threads are added to a write queue on the disk, a common zone for the disk IO units to be written; and assign, by the disk, write addresses in the common zone to the disk IO units.

19. The computing system of claim 18, further comprising instructions that, when executed by the one or more processors, configure the computing system to:

report, from the disk, post-write logical block addresses (LBAs) comprising locations in the common zone where the disk IO units were written.

20. The computing system of claim 18, further comprising the instructions that, when executed by the one or more processors, configure the computing system to:

receive the nameless write instructions at respective time intervals, one IO unit per thread of the plurality of threads being received per time interval; and append the disk IO units of the plurality of threads sequentially to the write queue such that a subset of the disk IO units received during a same time interval are arranged as a consecutive sequence within the write queue and assigned sequential addresses in the common zone.

* * * * *